United States Patent
De Rudnicki et al.

(10) Patent No.: US 11,882,822 B2
(45) Date of Patent: Jan. 30, 2024

(54) SYSTEM AND METHOD FOR SPRAYING A PRODUCT, IN PARTICULAR A PLANT-PROTECTION PRODUCT

(71) Applicant: INSTITUT NATIONAL DE RECHERCHE POUR L'AGRICULTURE, L'ALIMENTATION ET L'ENVIRONNEMENT, Paris (FR)

(72) Inventors: Vincent De Rudnicki, Montpellier (FR); Jean-Francois Bonicel, Montpellier (FR); Raphael Cherfan, Haguenau (FR)

(73) Assignee: INSTITUT NATIONAL DE RECHERCHE POUR L'AGRICULTURE, L'ALIMENTATION ET L'ENVIRONNEMENT, Paris (FR)

( * ) Notice: Subject to any disclaimer, the term of this patent is extended or adjusted under 35 U.S.C. 154(b) by 533 days.

(21) Appl. No.: 16/956,433

(22) PCT Filed: Dec. 20, 2018

(86) PCT No.: PCT/EP2018/086355
§ 371 (c)(1),
(2) Date: Jun. 19, 2020

(87) PCT Pub. No.: WO2019/122221
PCT Pub. Date: Jun. 27, 2019

(65) Prior Publication Data
US 2020/0315155 A1 Oct. 8, 2020

(30) Foreign Application Priority Data

Dec. 22, 2017 (FR) ..................... 1763165

(51) Int. Cl.
*A01M 7/00* (2006.01)
*B05B 1/04* (2006.01)
(Continued)

(52) U.S. Cl.
CPC ........ *A01M 7/0042* (2013.01); *A01M 7/0014* (2013.01); *B05B 1/044* (2013.01); *B05B 7/0075* (2013.01); *B05B 12/18* (2018.02)

(58) Field of Classification Search
CPC ....... B05B 1/044; B05B 7/0075; B05B 12/18; A01M 7/0014; B05C 11/06
See application file for complete search history.

(56) References Cited

U.S. PATENT DOCUMENTS 2,139,628 A * 12/1938 Terry ...................... B05C 11/06
239/587.5
2,488,467 A * 11/1949 De Lisio ................. F04D 25/08
239/561
(Continued)

FOREIGN PATENT DOCUMENTS

AU   2009202946 A1   2/2010
EP   0653157 A1   5/1995
(Continued)

OTHER PUBLICATIONS

International Preliminary Report on Patentability (Chapter II) received for PCT Patent Application No. PCT/EP2018/086355, dated Apr. 8, 2020, 17 pages (6 pages of English Translation and 11 pages of Original Document).
(Continued)

*Primary Examiner* — Joseph A Greenlund
(74) *Attorney, Agent, or Firm* — WOMBLE BOND DICKINSON (US) LLP

(57) ABSTRACT

The present invention relates to a system for spraying a product, notably a plant-protection product, comprising
(Continued)

product spray nozzles (10) and airflow generating means (110), characterized in that the airflow generating means comprise an outlet (112) in the form of an annular slit designed to generate an airflow (102) in the form of a continuous tubular curtain of air enclosing the jets (12) emanating from the spray nozzles (10) and that the sprayed product cannot cross.

20 Claims, 8 Drawing Sheets

(51) Int. Cl.
    *B05B 7/00*                (2006.01)
    *B05B 12/18*             (2018.01)

(56) References Cited

U.S. PATENT DOCUMENTS

| | | | | |
|---|---|---|---|---|
| 2,720,425 A * | 10/1955 | Coanda | B05B 3/1057 | 406/79 |
| 2,770,501 A * | 11/1956 | Coanda | B01F 25/3132 | 239/545 |
| 3,517,888 A * | 6/1970 | Mitterer | B05B 1/3026 | 239/579 |
| 3,625,426 A * | 12/1971 | Swanson | A01M 7/0014 | 239/77 |
| 3,750,955 A * | 8/1973 | Nakai | B05B 7/0869 | 239/420 |
| 4,270,702 A * | 6/1981 | Nicholson | B26D 7/08 | 239/455 |
| 4,515,313 A * | 5/1985 | Cavanagh | B05B 1/044 | 239/455 |
| 4,767,056 A * | 8/1988 | Demetrius | B05B 12/18 | 239/290 |
| 4,795,095 A * | 1/1989 | Shepard | B05B 3/105 | 239/290 |
| 5,028,002 A * | 7/1991 | Whitford | A01M 7/0014 | 47/1.7 |
| 5,062,572 A * | 11/1991 | Reiter | A01M 7/0042 | 239/300 |
| 5,214,876 A * | 6/1993 | Sukup | A01M 5/08 | 43/140 |
| 5,248,086 A * | 9/1993 | Waldrum | B05D 1/02 | 239/10 |
| 5,251,818 A * | 10/1993 | Manor | A01M 7/0014 | 47/1.7 |
| 5,974,728 A * | 11/1999 | Nichols | A01M 21/04 | 43/140 |
| 5,996,904 A * | 12/1999 | Smeraldi | A01M 7/0014 | 239/595 |
| 6,302,332 B1 * | 10/2001 | Panneton | A01M 7/0067 | 239/8 |
| 6,318,642 B1 * | 11/2001 | Goenka | B05B 7/0416 | 239/296 |
| 8,814,067 B2 * | 8/2014 | Freers | B05C 11/06 | 239/548 |
| 9,011,116 B2 * | 4/2015 | Li | F04D 25/105 | 417/84 |
| 9,013,961 B1 * | 4/2015 | Nicholson | A01M 29/22 | 367/139 |
| 9,630,195 B2 * | 4/2017 | Johnson | A01M 7/0014 | |
| 10,433,535 B2 * | 10/2019 | Hiddema | A01M 7/0071 | |
| 10,639,653 B1 * | 5/2020 | Shook | B05B 1/048 | |
| D909,260 S * | 2/2021 | De Rudnicki | D12/163 | |
| 11,154,045 B2 * | 10/2021 | Hiddema | A01M 7/0075 | |
| D950,428 S * | 5/2022 | De Rudnicki | D12/163 | |
| 2003/0006295 A1 * | 1/2003 | Kenny | A01M 7/0014 | 239/164 |
| 2003/0115709 A1 * | 6/2003 | Haruch | F26B 21/004 | 15/309.2 |
| 2012/0248218 A1 * | 10/2012 | Hoeben | B05B 1/28 | 239/150 |
| 2012/0273070 A1 * | 11/2012 | Freers | B05B 1/044 | 137/565.01 |
| 2013/0019950 A1 * | 1/2013 | VanderPyl | B05B 1/02 | 239/589 |
| 2013/0146678 A1 * | 6/2013 | Johnson | B05B 12/18 | 239/291 |
| 2013/0199372 A1 * | 8/2013 | Nock | B05B 1/14 | 239/548 |
| 2013/0251545 A1 * | 9/2013 | VanderPyl | F26B 21/004 | 239/590 |
| 2015/0041003 A1 * | 2/2015 | Freers | F24F 13/065 | 137/561 A |
| 2016/0262371 A1 * | 9/2016 | Hiddema | A01M 7/0067 | |
| 2017/0232461 A1 * | 8/2017 | Chadin | C23D 1/00 | 239/398 |
| 2018/0168140 A1 * | 6/2018 | Pellenc | B05B 7/0081 | |
| 2018/0368386 A1 * | 12/2018 | Pérez Salvador | B05B 7/00 | |
| 2020/0315155 A1 * | 10/2020 | De Rudnicki | B05B 1/044 | |
| 2021/0368769 A1 * | 12/2021 | Godia | A01M 7/0085 | |

FOREIGN PATENT DOCUMENTS

| | | |
|---|---|---|
| EP | 1468604 A1 | 10/2004 |
| EP | 2420138 A1 | 2/2012 |
| EP | 2441523 A1 | 4/2012 |
| FR | 1287453 A | 3/1962 |
| FR | 1499433 A | 10/1967 |
| FR | 2407025 A1 | 5/1979 |
| FR | 2641479 A1 | 7/1990 |
| FR | 2905559 A1 | 3/2008 |
| FR | 2969902 A1 | 7/2012 |

OTHER PUBLICATIONS

International Search Report received for PCT Patent Application No. PCT/EP2018/086355, dated Apr. 4, 2019, 7 pages (3 pages of English Translation and 4 pages of Original Document).

* cited by examiner

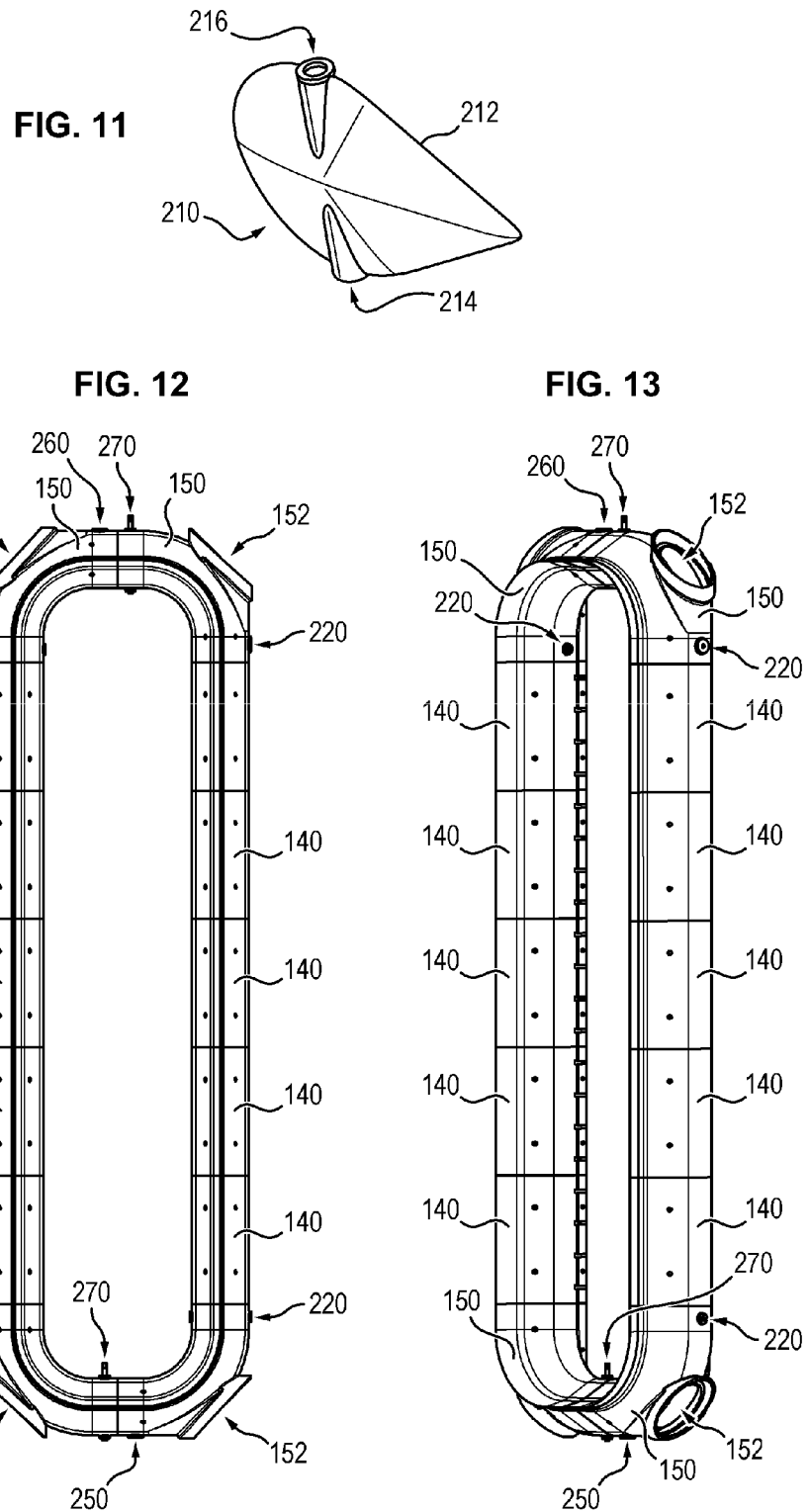

SYSTEM AND METHOD FOR SPRAYING A PRODUCT, IN PARTICULAR A PLANT-PROTECTION PRODUCT

The present invention relates to the field of systems for spraying treatment products, especially for spraying plant-protection products on plants.

GENERAL TECHNICAL FIELD

Current standards and ecological constraints impose controls on the spreading of plant-protection products.

PRIOR ART

Many systems have already been proposed for operating the spraying of plant-protection products.

Three distinct types of spraying systems are generally known.

A first type of spraying system uses projected jets. These units comprise nozzles which ensure fragmentation of jets sprayed in droplets. The sprayed jets are directed towards the vegetation to be treated. The product droplets reach their target of plants, due to their intrinsic speed.

A second type of spraying system called "air blast" comprises ventilation means generating high-volume air flow combined with spray nozzles. In this case the nozzles ensure fragmentation of jets sprayed in droplets, but the air flow ensures transport of droplets towards the plants to be treated.

A third type of spraying system, called pneumatics, functions without nozzles and comprises ventilation means adapted to generate air flow at very high speed and under pressure. Droplets are generated when the plant-protection product is put in contact with the air flow, the droplets being generated by fragmentation by the shock of the treatment liquid in the high-speed air current. The air flow in this case also participates in the transport and penetration of droplets within the vegetation.

In 1993, document EP 0 653 157 proposed a system comprising pressurised air jet diffusers associated with sprinklers for a treatment product liquid adapted to ensure homogeneous distribution of the treatment product in the air current obtained by all the diffusers.

In 2003, document EP 1 468 604 proposed spraying ramps which comprise product-spray nozzles associated with series of holes enclosing each nozzle, fed by a pressurised generator and intended to generate air flows the aim of which is to limit the impact of cross wind on the sprayed product jets originating from the nozzles. The concept proposed by this document, which generates turbulent air jets, has not however given total satisfaction and has been replaced by means described in later documents.

In 2010, document EP 2 420 138 proposed a spraying system inspired by that described in document EP 0 653 157, comprising a complex array of product-spray nozzles or sprinklers and pressurised air flow generation nozzles comprising central and lateral multiple air flow outlets arranged such that the plant-protection liquid flow mixes with induced air flow entrained by the air flows coming out of said outlets. The system described in this document likewise does not give total satisfaction. Its structure in particular is complex.

Faced with the difficulties encountered with the systems described in the above documents, in late 2010, document FR 2 969 902 proposed a tunnel sprayer for rows of plants which aimed to distance itself from techniques proposed previously and for this purpose collector panels intended to collect part of the sprayed product which does not reach the vegetation to be treated and for this purpose comprise suction means adapted to recover that portion of sprayed product which is not fixed to this vegetation. However, this system does not give total satisfaction either, because is particularly bulky.

Other known devices are disclosed in documents FR 1 499 433, EP 2 441 523, FR 2 641 479, US 2016 262371 and AU 2009 202946.

Technical Problem

The aim of the present invention is to propose novel means for improving the prior art.

The particular aim of the present invention is to propose means of simple and reliable design, which improve the control of spreading of plant-protection products and confine them to the target plant.

GENERAL DESCRIPTION OF THE INVENTION

The above aims are attained according to the present invention by way of a product spraying system, especially of plant-protection product, comprising product spray nozzles and air flow generator means, wherein the air flow generator means comprise an outlet in the form of an annular slit adapted to generate air flow in the form of a continuous tubular curtain of air enclosing the jets originating from the spray nozzles, impassable by the sprayed product.

The air flow generator means are preferably configured such that the air flow enclosing the jets originating from the spray nozzles does not interfere with the propulsion of this product when at the outlet of said nozzles.

The outlet in the form of an annular slit highly preferably has an oblong contour.

According to other advantageous features of the invention:

- The air flow generation means are modular for adapting the geometry of the generated confinement curtain.
- The output slit of the air flow generation means is delimited by asymmetric lips, implementing a Coanda effect and acting on the incoming or outgoing inflexion of the air flow, and therefore on the geometry of the curtain of air.
- The output slit of the air flow generation means is delimited by lips forming an angle between their internal and external faces of the order of 15°.
- The thickness of the output slit of the air flow generation means is between 1 and 6 mm, advantageously between 1 and 4 mm;
- The thickness of the output slit of the air flow generation means is variable and adjustable.
- the straight section of the air flow generation means terminating on the output slit is in the form of a water drop.
- the speed of the air flow is determined to create a laminar flow at the outlet of the slit, which transforms into a turbulent flow on the target plants.
- the nozzles are variable in position, at least in height and preferably according to three axes x, y and z, and in orientation.

The present invention also relates to a support device comprising at least one system of the above type.

The device preferably comprises at least two systems of the above type facing each other and forming a high-clearance sprayer and simultaneously treating two opposite sides of a target plant.

The present invention also relates to a product spraying process, especially plant-protection product, characterised in that it comprises steps consisting of spraying pressurised product jets at the outlet of nozzles connected to product supply means, and confining these product jets by means of a confinement curtain of the sprayed product, impassable by the sprayed product, generated by air flow generator means comprising an outlet in the form of an annular slit adapted to generate air flow in the form of a continuous tubular curtain of air enclosing the jets originating from the spray nozzles.

BRIEF DESCRIPTION OF FIGURES

Other characteristics, aims and advantages of the invention will emerge from the following detailed description and with respect to the appended drawings given by way of non-limiting examples and in which:

FIG. 1 illustrates a schematic view in horizontal section of a system according to a first embodiment of the present invention, FIG. 2 illustrates a vertical frontal view of this system, FIG. 3 illustrates a schematic view in horizontal section of a system according to a second preferred embodiment of the present invention, FIG. 4 illustrates a section of a conduit of the system according to the present invention, FIG. 5 illustrates a section of a conduit of the system according to a variant of the present invention in which control and adjustment means of the thickness of the output slit of the air flow generation means are provided, FIG. 6 illustrates an exemplary embodiment of a rectilinear segment of the conduit according to the present invention, FIG. 7 illustrates an exemplary embodiment of an incurved segment of the conduit according to the present invention, FIG. 8 illustrates a system according to the present invention of modular type, formed by assembling different segments, FIG. 9 schematically illustrates a laminar flow according to the invention, at the outlet of the output slit of the air flow generation means and which transforms into a turbulent flow in the region of the vegetation to be treated, FIG. 10 schematically illustrates a view in perspective of a variant embodiment of a spraying device according to the present invention, comprising more than two systems facing each other and forming a high-clearance sprayer, in this case two pairs of such systems facing each other, to simultaneously treat two opposite sides of two rows of a target plant, FIG. 11 schematically illustrates an orientable valve flap likely to be integrated into a section of conduit to control the rate of air flow, or even the distribution of this flow between different segments of the conduit, FIG. 12 illustrates a frontal view of a system according to the present invention, FIG. 13 illustrates a view in perspective of this same system, and FIGS. 14 and 15 illustrate two perspective views of a segment of conduit according to the present invention.

DETAILED DESCRIPTION OF THE INVENTION

As illustrated in the appended FIGS. 1 to 3, the invention proposes a system comprising product spray nozzles 10, for example plant-protection product, and air flow generator means 100 comprising a conduit 110 which has an outlet 112 in the form of a slit adapted to generate air flow in the form of a continuous air blade 102 produced laterally on the jets 12 side and originating from the spray nozzles 10.

The continuous air blade 102 constitutes a confinement curtain of the jets 12 of the sprayed product similar to a shield formed by a continuous air blade, impassable by the sprayed product, preferably without interfering with the propulsion of this product at the outlet of said nozzles 10.

This barrier is symbolised in FIGS. 1 and 3 by the dashed lines referenced 14.

As illustrated in the appended figures, according to the invention the conduit 110 defines an outlet 112 in the form of an annular slit adapted to generate air flow in the form of a tubular continuous air blade 102 enclosing the jets 12 originating from the spray nozzles 10.

Such a tubular air curtain 102 optimises confinement of the plant-protection products on the target plant to be treated referenced V in FIGS. 1 and 3.

The above system and especially the conduit 110 are preferably placed on a self-propelled support device such as a vehicle of chaser or robot type, especially for viticulture treatment.

Such devices are known per se, and will therefore not be described in detail hereinbelow.

Even more precisely, the device preferably comprises at least two systems of above type facing each other and forming a high-clearance sprayer and simultaneously treating two opposite sides of a target plant, as illustrated in FIG. 3. In this case the tubular air flow 102, as well as the air jets 12, are directed respectively towards each other, in the direction of the median vertical and longitudinal plane P of the device.

FIG. 3 shows the support device by its contour C. Such a device can be borne by wheels or support tracks R also shown in FIG. 3.

According to the invention the conduit 110 is formed by an oblong ring, for example in the general form of a racetrack comprising two parallel rectilinear sections 114, 116 connected by overall incurved linking ends 115, 117.

The conduit 110 is preferably formed by assembling a plurality of rectilinear segments 140 and incurved segments 150. The conduit 110 is accordingly modular. Its geometry can easily be adapted to the dimensions of the target plant to be treated.

The invention is of course not limited to an oblong geometry of conduit 110 as a racetrack. The invention applies to all types of ring geometry, for example and not limiting to geometries in ellipse, circle, or even square form the angles of which will be more or less rounded according to the preferred application and the aerodynamic optimisation of the system.

FIG. 6 illustrates an example of a rectilinear segment 140.

FIG. 7 illustrates an example of an incurved segment 150.

According to FIG. 8 the conduit 110 is therefore formed by assembling 6 rectilinear segments 140 each constituting rectilinear sections 114 and 116 and 2 incurved segments 150 each constituting linking ends 115 and 117, or a total of 16 segments 140 and 150.

The use of incurved segments 150, and not angular, guarantees a continuous annular curtain of the air flow 102, by ensuring the continuity of the film of air.

By way of non-limiting example each of the rectilinear segments 140 can have a length of the order of 25 cm.

Of course, the invention is not limited to the particular embodiment shown in FIG. 8. Therefore each rectilinear section 114 and 116 can be formed by a number of different rectilinear segments 140 of 6 and each of the linking ends 115 and 117 can comprise a rectilinear segment 140 at least inserted in between the two incurved sections 150.

The air inlet originating from the generator, in the conduit 110, can form the subject of many variant embodiments.

As is evident from FIG. 8, the air inlet coming from the generator, in the conduit 110, is preferably operated in the region of an incurved segment 150, or of at least one incurved segment 150, in the region of a spout 152. More precisely still, said spout 152 is a cylindrical linking spout whereof the central axis is parallel to the longitudinal direction of the rectilinear segments 140 facing the assembly and highly advantageously coaxial to the centre of these rectilinear segments 140 opposite.

FIGS. 12 and 13 show a variant embodiment according to which several possible inlets intended to be attached to respective sources are provided.

More precisely according to the representation given in FIGS. 12 and 13, a possible air inlet is provided in the region of each of the four incurved segments 150, or four possible air inlets.

In FIGS. 12 and 13, these four inlets are referenced 152.

When the user utilises such a system having four possible inlets for the same conduit, he can selectively either connect each of these four inlets 152 to a pressurised source of air flow, such as a fan associated with motorisation, or connect just some of these inlets 152, for example a single inlet, to a pressurised source of air flow, by blocking off the other inlets not connected to a pressurised source of air flow by an additional lid.

Figure 10:
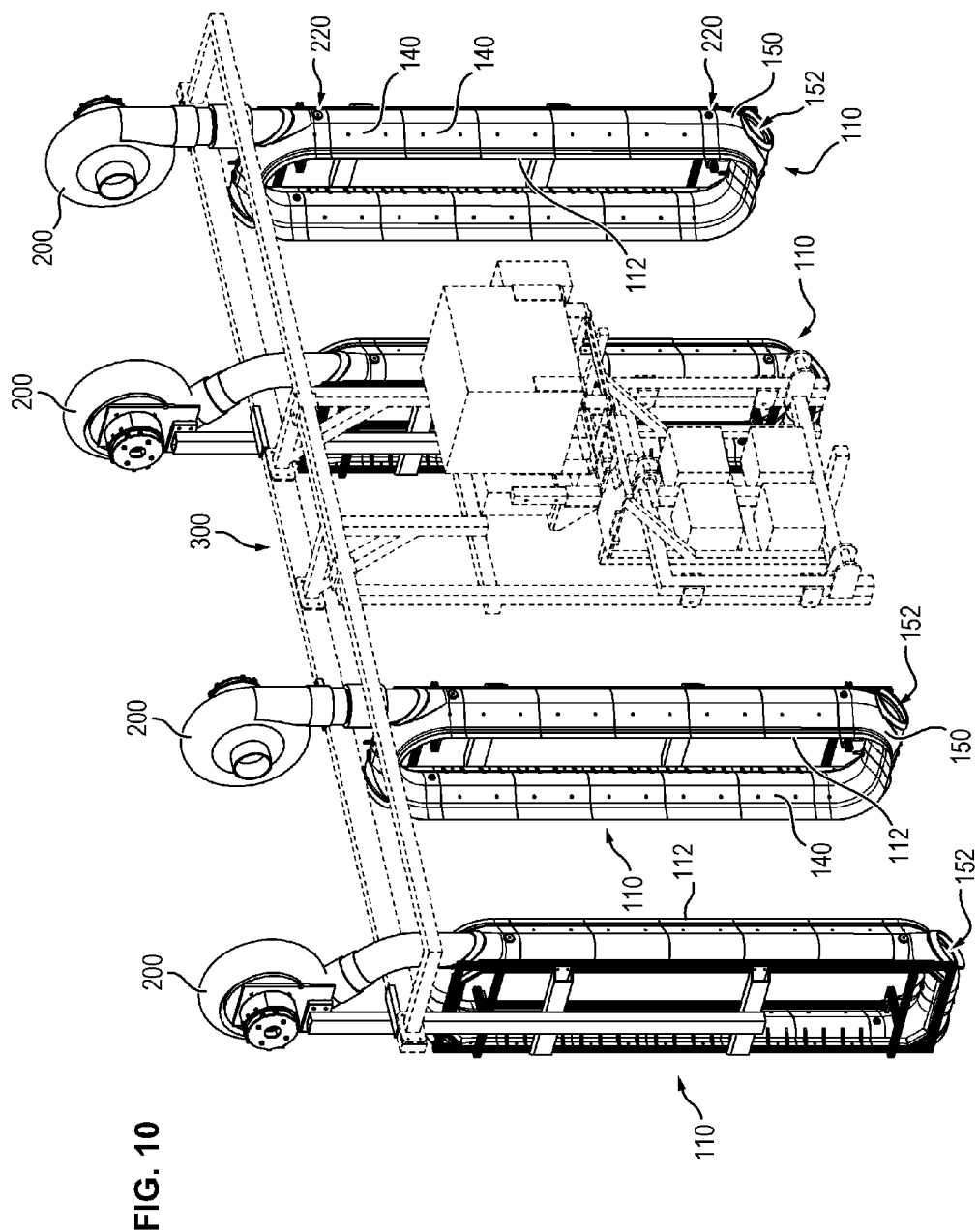

FIG. 10 shows implantation of a single fan associated with its motorisation, referenced 200, for each system or conduit 110.

The embodiment shown as a variant in FIGS. 12 and 13 has ample scope for configurations as to the implantation of sources of air flow, that is, fans.

The use of multiple sources attached to a conduit 110, for example four sources attached to the same conduit, also uses associated fans and motors of reduced size and power relative to an embodiment with fan and single motor.

From FIG. 10, it is also clear that the air flow supply fans at 200 are preferably implanted in the upper part of the support chassis, or above the latter.

The support chassis of the different spraying systems each comprising a conduit 110 can form the subject of many embodiments. According to the particular embodiment represented in FIG. 10, this support chassis is formed by a horizontal beam 300 arranged in the upper part of the installation, at a height above the maximal height of the vegetation to be treated such that the device can be moved on the vegetation without the beam 300 interfering with the vegetation. The different conduits 110 are suspended on this beam 300 according to a pitch which corresponds to the spacing between the different rows of vegetation to be treated.

If needed, the support structure of the fans 200 on the support chassis can be articulated to allow controlled inclination of these fans 200 towards the interior of the rows of treated culture between two systems 100 facing each other.

The fans 200 are placed and oriented nearest to the vegetation to be treated to limit to a maximum the influence of displacement of the device.

Figure 6:
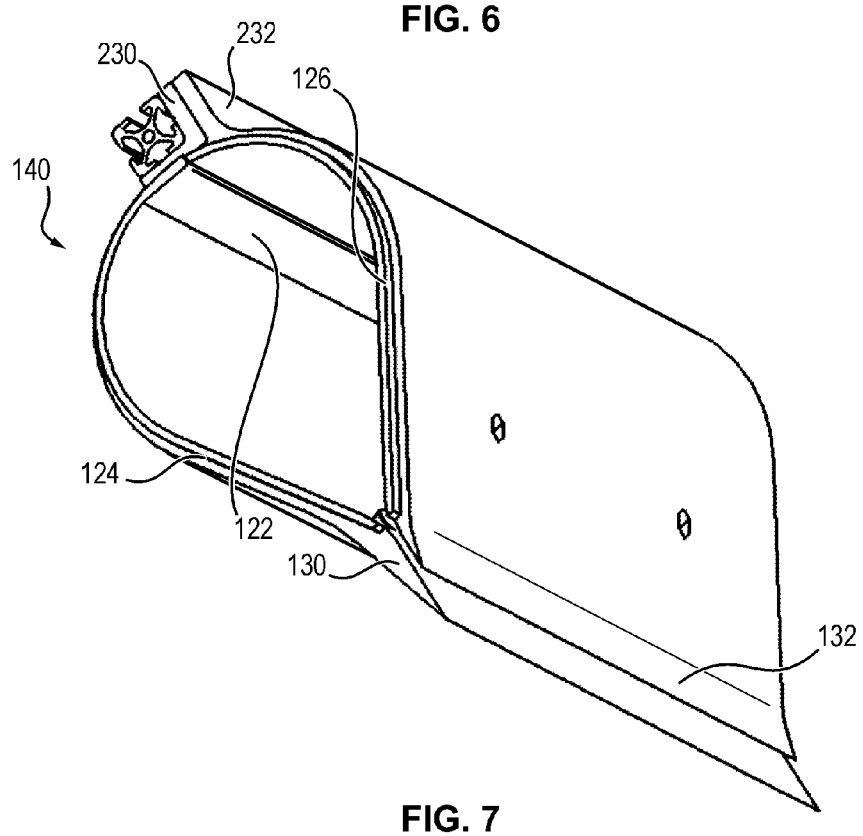
Figure 7:
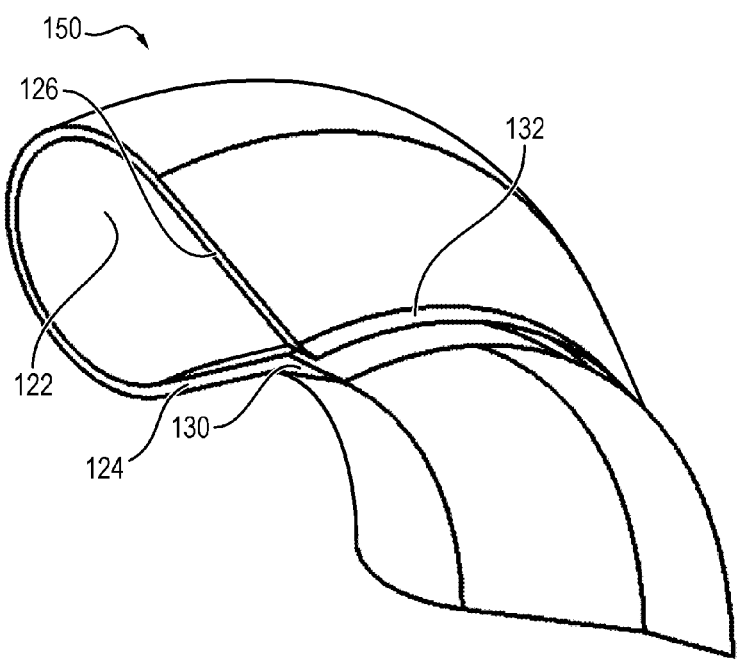
Figure 8:
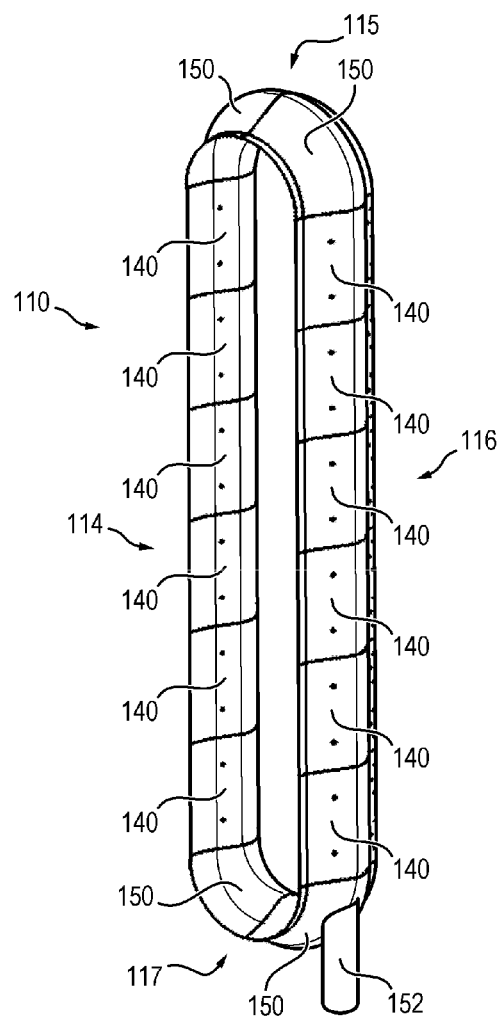
FIG. 8 shows a single possible air inlet in the conduit 110 in the form of the spout 152.

Sealing means are preferably provided between each pair of adjacent segments 140, 150. FIG. 6 and FIG. 15 show a groove 160 on the edge of a segment especially for this purpose, intended to penetrate a complementary throat or groove 162 formed on the segment opposite and evident for example in FIG. 14.

The groove 160 and the complementary throat 162 form a male/female array or labyrinth which ensures tightness between two adjacent segments 140, 150, whether these are two adjacent rectilinear segments 140, of two adjacent incurved segments 150, or again an adjacent rectilinear segment 140 and an incurved segment 150.

The straight section of each segment 140 and 150 is in the form of a closed water drop however having an opening corresponding to the slit 112.

Figure 4:
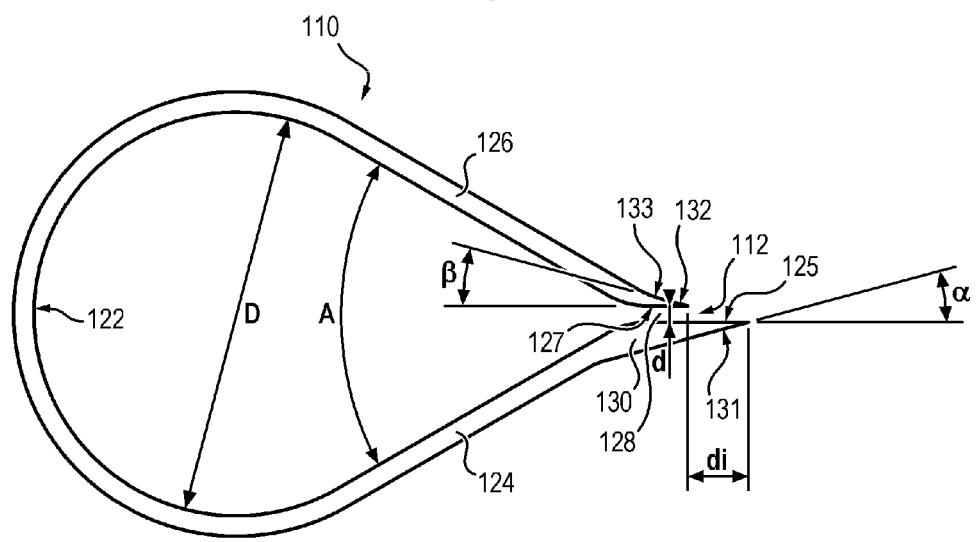

As is clear from FIG. 4, each segment 140 and 150 is delimited on the inside by a cap 122 circular in revolution covering an angular opening slightly larger than 180°, extended by two overall flat facets 124, 126 which converge by moving away from the cap 122, according to an angle A typically of the order of 60°.

The diameter D of the cap 122 is typically of the order of 66 mm.

In the region of their free ends, opposite the cap 122, the facets 124 and 126 define between them a channel 128 which corresponds to the above slit 112.

More precisely at this level the two facets 124 and 126 are delimited by flat and parallel surfaces 125 and 127.

The distance d between these surfaces 125 and 127, which corresponds to the thickness of the slit 112 and consequently to the thickness of the curtain of air at the outlet of the system, is preferably between 1 and 6 mm, advantageously between 1 and 4 mm.

More precisely still, the distance d between the two surfaces 125 and 127 is preferably variable and adjustable for controlling the speed of the air flow at the outlet of the slit 112 and therefore the laminar flow scope of the generated curtain of air.

Figure 5:
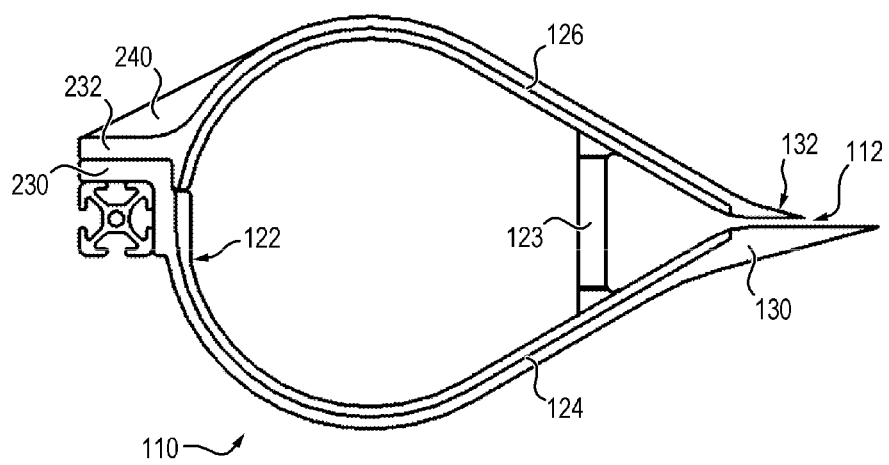

The adjustment means can form the subject of many embodiments and will not be described in detail hereinbelow. As illustrated in FIG. 5, they can be formed for example by threaded means 123 connected respectively to the two facets 124 and 126 and elastically regulate the distance between them in the region of the outlet channel 128.

The adjustment means 123 must be infrequent so as not to disrupt the air flow.

More precisely still according to the invention the two facets 124, 126 each comprise a lip 130, 132 in the region of their free end.

The lips 130 and 132 are delimited internally by the above flat and parallel surfaces 125 and 127.

The inventors have determined that such flat surfaces 125, 127 are optimal for ensuring linear compression of air as far as the outlet of the lips 130, 132.

The lips 130 and 132 are also delimited externally by respective overall flat surfaces 131, 133.

The surfaces 131 and 133 converge as they move away from the cap 122.

In terms of the invention, the surfaces 131 and 133 are preferably inclined at the same angle relative respectively to the internal surfaces 125, 127. In terms of the invention, the surfaces 131 and 133 are preferably inclined according to an angle referenced α and β of the order of 15° relative to the internal surfaces 125, 127. The inventors have determined that this angle was optimal to ensure the preferred Coanda effect.

The Coanda effect is well known per se to the skilled person and will therefore not be described hereinbelow.

By way of reminder, Coanda effect is an effect of attraction or attachment of a jet of fluid by a surface on which it flows such that the fluid follows the surface and undergoes deviation before detaching from the latter. This effect allows a considerable amplification ratio between the quantity of air coming from the generator means and supplied by the slit 112 and the volume of air entrained from the environment to form the continuous air flow 102.

The inventors consider that such an angle of the order of 15° is optimal for acceleration of air aspirated on the exterior of lips 130, 132.

As is also evident in the attached figures, according to the invention the lips 130 and 132 are preferably asymmetric, even more precisely of different length. In this case the lip 130 is longer than the lip 132. The lip 130 exceeds the lip 132 for example by a distance di of the order of 10 mm.

This asymmetry allows better control of laminarity of the generated flow, reinforces the amplification coefficient of the volume of entrained air and controls the angle of outlet of the air flow.

The number of nozzles 10 placed at the centre of the conduit 110 to spray the product on the target plant V depends on the geometry and dimensions of the conduit 110. By way of non-limiting example for example 3 or 4 nozzles 10 can be provided distributed linearly and equidistantly in the median longitudinal plane Pm of the conduit 110.

The nozzles 10 are preferably variable at least in height, preferably laterally and in depth, or according to three axes x, y and z in an orthonormal marker and in orientation, on the chassis of the device C. Their angular diffusion opening is also preferably variable. These adjustments are adapted especially to limit the potential residue of product during treatment.

The conduit 110 is supplied in pressurised air flow by all appropriate means for generating air flow under pressure adapted to produce a laminar effect at the outlet of the slit 112.

Figure 9:
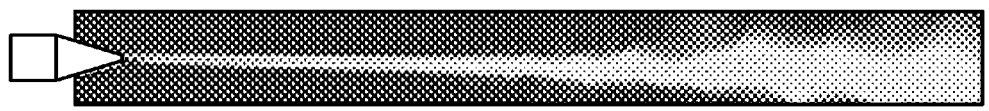

Even more precisely according to the invention the air flow, especially the speed of the air flow at the outlet of the slit 112, is adapted to generate a laminar flow at the outlet of the slit 112 as illustrated in FIG. 9, but a turbulent flow at a distance which corresponds to the distance of the plants, typically at a distance of the order of 30 cm.

This arrangement shakes the plants, especially their leaves and optimises homogeneous application of plant-protection product coming from the nozzles 10.

The speed of the air flow at the outlet of the channel 128 is typically between 20 m/s and 100 m/s.

The air flow generator means are also preferably adapted to provide a rate between 400 and 1500 m³/h creating sufficient resulting pressure in the terminal cone of the drop profile 110, defined by the facets 124 and 126 to accelerate the air outlet speed.

The air flow generator means can be formed by all appropriate means known to the skilled person, for example a screw air compressor or a blade air compressor or even a turbine fan.

If needed, the conduit 110 can comprise inside one or more variables valves adapted to occlude a variable portion of the section of the conduit 110 to control air flow in the different segments of the conduit, and the distribution of the air flow between different parties of the conduit.

FIG. 11 schematically illustrates an exemplary embodiment of a flap 210 for such a valve. The flap 210 preferably has a contour 212 complementary to the straight section of the conduit 110, or overall a contour in the form of a water drop, such that the flap 210 completely blocks the conduit 110 when it extends transversally to the axis of the segment of conduit 110.

The flap 210 can however be adjusted in its orientation relative to the axis of the segment of conduit 110 which supports it, by rotation about an axis of rotation embodied by two coaxial sleeves or trunnions 214, 216.

Such valves can be implanted at all appropriate points of the conduit 110.

According to a preferred embodiment, applicable especially in cases of using a single fan per system 100, a valve equipped with a flap 210 can be provided respectively in the upper horizontal part and in the lower horizontal part of the conduit 110.

Under reference 270 FIGS. 12 and 13 show an adjustment axis of the orientation of the flaps 210.

The use of variable-blocking flap valves 210 balances circulation of the air flow between the front and the rear of the device, that is, between the two vertical sections of the same system 100. Adjustment can be ensured especially when the support device is moving. In reference to the direction of displacement of the device, it avoids for example an overly powerful rear jet and risking cancelling out treatment done upstream.

According to a particular embodiment the valve flaps 210 are used to control air flow such that the air flow exiting via the outlet 112 is greater over the section of this outlet located on the front, in reference to the direction of displacement of the device, than over the section of this outlet located on the rear. This arrangement especially avoids the rear air flow eliminating the treatment previously deposited on the vegetation.

Regulating the valves/flaps 210 can be operated as a function of the density of the vegetation and the speed of displacement of the device.

If needed, the flaps 210 can be motorised to ensure automatic orientation, for example on the basis of signals originating from sensors positioned in the conduit 110, such as carefully placed flow or pressure sensors.

Under reference 220 FIGS. 12 and 13 show four preferable implantation sites for pressure sensors in the region of the zones of the incurved segments 150 adjacent to the rectilinear segments 140, or near the angles of the system.

The flaps 210 can be oriented as a function of the signals originating from flow and/or pressure sensors, and according to the displacement speed and pressure of the spray nozzles 10, manually or by an adapted central unit.

As indicated previously the present invention also relates to the product spraying process, especially plant-protection product, by means of the system previously described.

This process comprises especially steps which consist of spraying pressurised product jets 12 at the outlet of the nozzles 10 connected to all appropriate product supply means, and confining these product jets 12 by means of the annular confinement curtain 102.

The supply means for plant-protection product for supplying the product to the nozzles 10 can form the subject of many embodiments known per se and therefore will not be described in detail hereinbelow.

In terms of the invention, "of the order of" means a value which can vary by more or less 10% relative to the indicated value.

Of course, the present invention is not limited to the embodiments which have just been described, but extends to all variants in keeping within its spirit.

The conduit 110 is preferably variable in height on the chassis of the device C to allow adaptation to the height of the vegetation V to be treated. The conduit 110 is variable in width by addition of rectilinear segments 140 between the incurved segments 150.

A conduit structure 110 formed by assembling different sections or segments 140, 150 has been described previously. As a variant however the conduit 110 can be formed from a single block.

By way of advantage, the conduit 110 can be self-supporting, and comprise a single fastening point due to the use of a laminated profile.

FIGS. 5, 6, 14 and 15 show sails 230, 232 of the same material as on the external face of the wall of the conduit 110 opposite the outlet 112. These sails 230, 232 are parallel and attached. They extend parallel to the longitudinal axis of the conduit 110 and serve as support to the conduit 110. For this, the sails 230, 232 can be fitted with through bores intended to receive any fastening means such as threaded means.

The conduit 110 can specifically be formed from two complementary shells extending over an angular opening of the order of 180°, from a lip 130, 132 as far as the base of the respectively associated sail 230, 232. The two shells are held to ensure closing of the conduit 110 by fastening two sails 230, 232 together.

Figure 14:
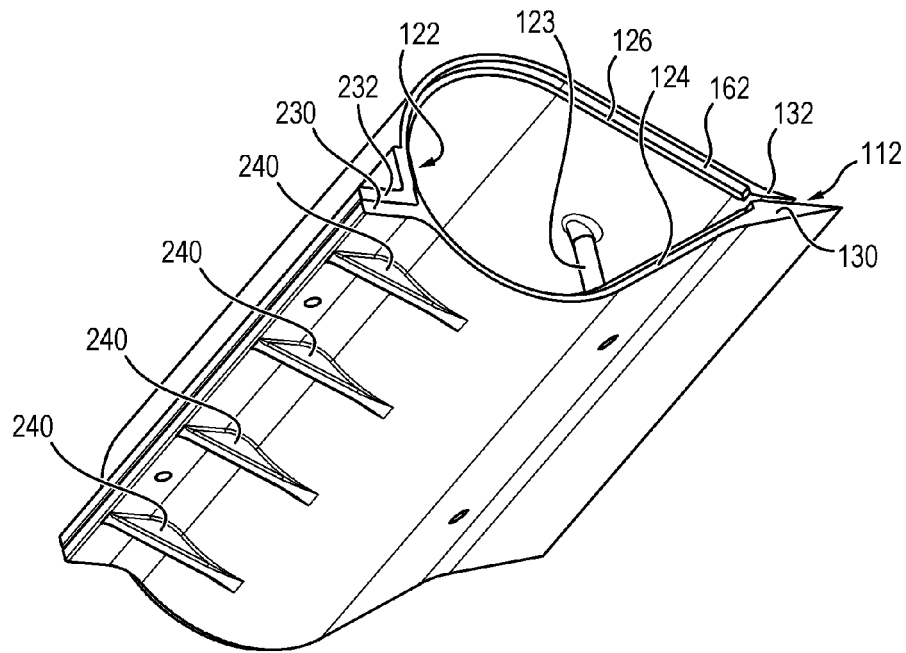
Figure 15:
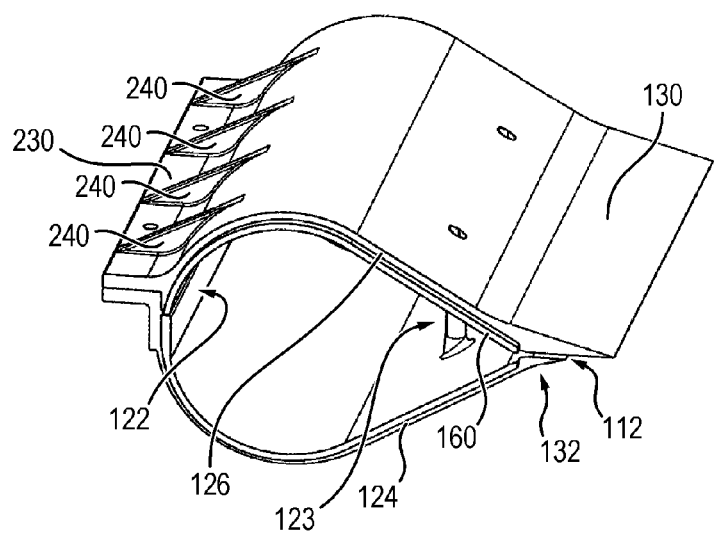

FIGS. 14 and 15 also show fins 240 forming a stiffener and a reinforcement arranged on the rear of the elements 140, 150 constituting the conduit 110. These fins 240 are oriented perpendicularly to the longitudinal axis of the conduit 110 and the sails 230, 232. They connect the external surface of the conduit 110 and one face of the sails 230, 232. The fins 240 ensure support triangulation of the sails 230, 230 and of the conduit 110 and serve to stiffen the structure of the conduit 110.

As shown in FIGS. 12 and 13 each conduit 110 preferably comprises a discharge spout 250 located in the lower part of the conduit 110. The discharge spout 250 is configured to be opened selectively, for example by withdrawing a stopper, then reclosed on completion of a discharge operation. To allow rapid and efficacious discharge by means of the spout 250, the conduit 110 preferably also has a nozzle forming an air intake 260 in the upper part of the conduit 110, also likely to be selectively opened then reclosed.

If needed, the location of the air intakes 260 can coincide with the support point of the sensors 220.

Figure 2:
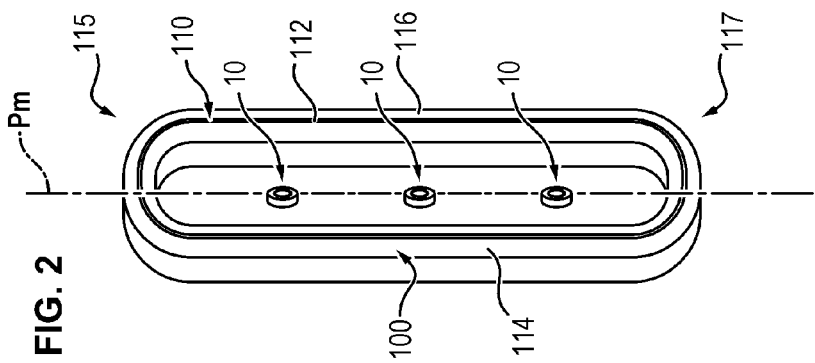
Figure 1:
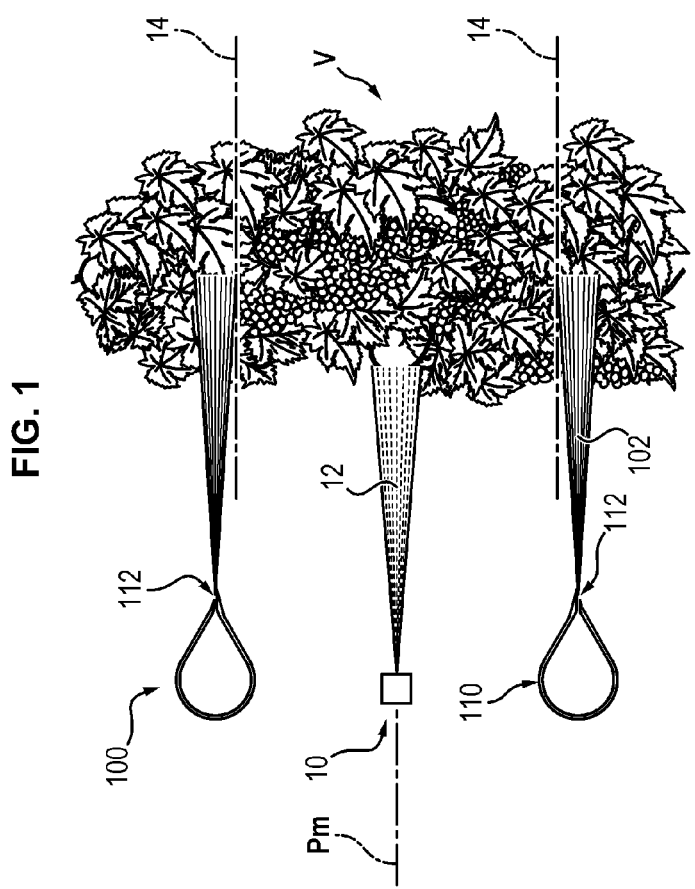
Figure 3:
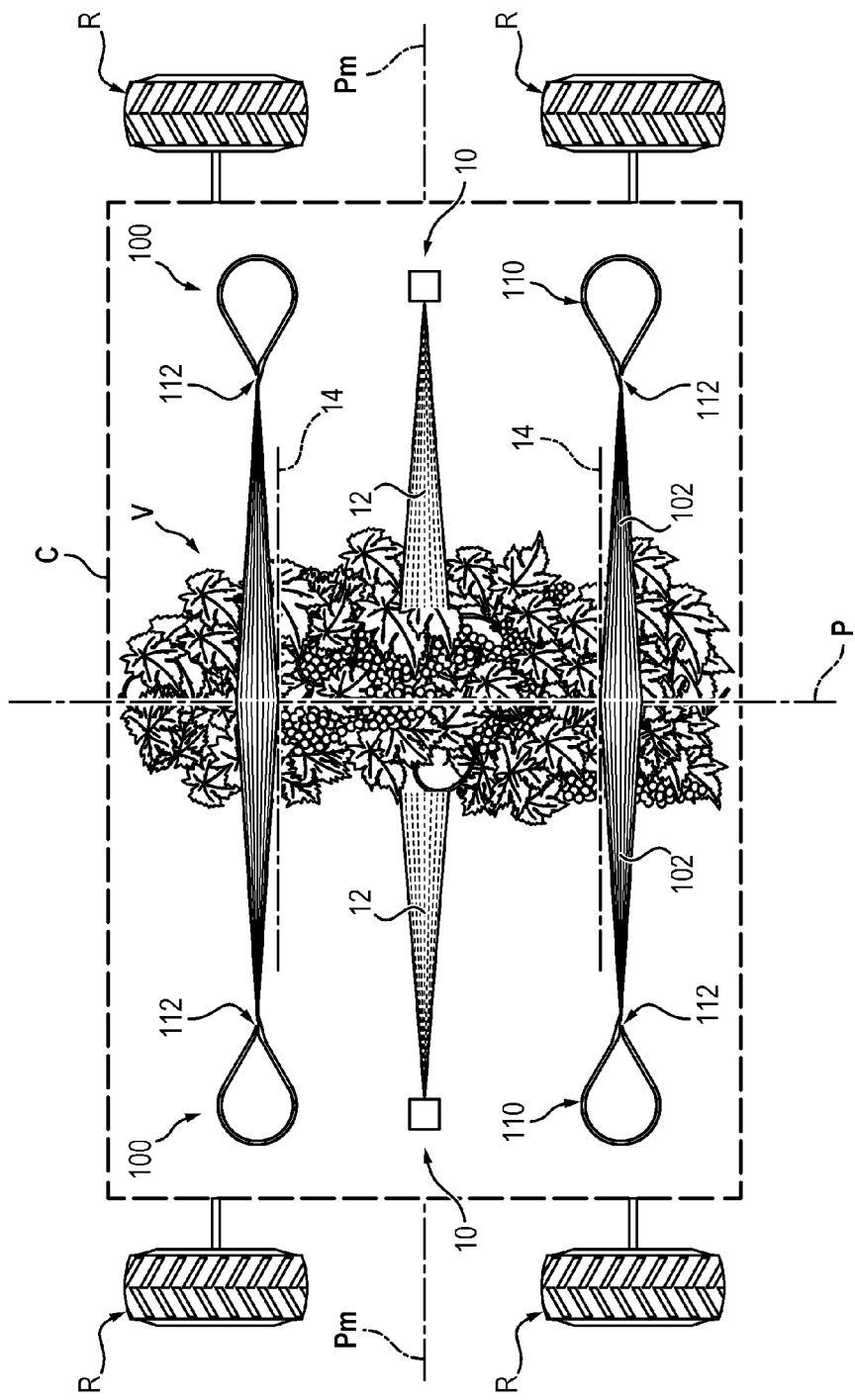

With respect especially to FIG. 3, a device comprising two systems of the abovementioned type facing each other forming a high-clearance sprayer and simultaneously treating two opposite sides of a target plant has been described previously. In this case the tubular air flow 102, as well as the air jets 12, are directed respectively towards each other in the direction of the median vertical and longitudinal plane P of the device.

But it is not limited to this embodiment. The devices according to the present invention can indeed comprise more than two systems facing each other.

FIG. 10 illustrates a view in perspective of a variant embodiment of a spraying device according to the present invention comprising more than two systems facing each other forming a high-clearance sprayer, in this case two pairs of such systems facing each other, or four conduits 110 arranged in the form of two pairs of conduits respectively facing each other, to simultaneously treat two opposite sides of two rows of a target plant.

The invention claimed is:

1. A product spraying system
the system comprising spray nozzles for spraying a plant-protection product and air flow generator means comprising a conduit comprising two parallel rectilinear sections, the spray nozzles being placed and distributed linearly at a centre of said conduit between the two rectilinear sections, the spray nozzles being equidistantly distributed in a median longitudinal plane of said conduit,
wherein
said conduit comprises overall incurved linking ends connecting said two parallel rectilinear sections, such that the conduit has the form of an oblong ring and has an outlet in the form of an annular slit of oblong contour adapted to generate an air flow in the form of a continuous tubular air confinement curtain laterally from the spray nozzles, the air curtain enclosing the jets originating from the spray nozzles and being impassable by the plant-protection product sprayed by the spray nozzles
wherein
the conduit is formed by assembling a plurality of rectilinear segments and incurved segments,
each of the rectilinear segments and of the incurved segments being delimited on the inside by a cap covering an angular opening larger than an angle with a value of 180 degrees, the cap being extended by two overall flat facets which converge by moving away from the cap to the annular slit, according to an angle with a value about 60 degrees, in order to generate a laminar flow at the outlet of the annular slit and a turbulent flow directed to the plants to be sprayed.

2. The system according to claim 1, wherein
the air flow generator means are configured such that the air flow enclosing the jets originating from the spray nozzles does not interfere with the propulsion of the plant-protection product exiting from said spray nozzles.

3. The system according to claim 1, wherein
the air flow generator means are modular to adapt the geometry of the generated confinement curtain.

4. The system according to claim 1, wherein
the outlet of the annular slit of the air flow generator means is delimited by asymmetric lips implementing a Coanda effect.

5. The system according to claim 1, wherein
the outlet of the annular slit of the air flow generator means is delimited by lips forming an angle of 15 degrees between an internal face and an external face.

6. The system according to claim 1, wherein
a thickness of the outlet of the annular slit of the air flow generator means is between 1 millimeter and 6 millimeters.

7. The system according to claim 1, wherein
a thickness of the outlet of the annular slit of the air flow generator means is variable and adjustable.

8. The system according to claim 1, wherein
a speed of the air flow is determined to create a laminar flow exiting from the annular slit, which transforms into a turbulent flow on target plants.

9. The system according to claim 1, wherein
a speed of the air flow exiting from the annular slit is between 20 m/s and 100 m/s.

10. The system according to claim 1, wherein
the spray nozzles are variable in position, at least in height and in orientation.

11. The system according to claim 1, wherein
the flow generator means comprise at least one fan placed above a support frame.

12. The system according to claim 1, further comprising
at least one valve comprising an orientable flap for controlling distribution of the air flow on the outlet.

13. The system according to claim 1, wherein
the flow generator means comprise flow control means in the form of an orientable flap valve, such that the air flow exiting via the outlet is greater on a section of the outlet located forward regarding a direction of displacement of a self-propelling device supporting the system, than on a section of the outlet located rearward, in order to avoid a rear air flow eliminating a treatment previously deposited on a vegetation.

14. The system according to claim 1, wherein
the conduit of the air flow generator means comprises several attachment points with a pressurized source of air flow.

15. A support and self-propelling device comprising at least one system according to claim 1.

16. A device according to claim 15, wherein it comprises at least two systems facing each other, oriented such that the jets originating from the spray nozzles and the continuous tubular air confinement curtains generated by the two systems are directed respectively towards each other, for simultaneously treating two opposite sides of a target plant.

17. The system according to claim 1, wherein
a thickness of the outlet of the annular slit of the air flow generator means is between 1 millimeter and 4 millimeters.

18. The system according to claim 1, wherein
the spray nozzles are variable in position, in height and according to three axes x, y and z, and in orientation.

19. The system according to claim 1, further comprising
at least one valve comprising an orientable flap for controlling distribution of the air flow on the outlet and for defining different rates of different air flows between different zones of the outlet.

20. The system according to claim 1, wherein
the conduit of the air flow generator means comprises four attachment points with a pressurized source of air flow, the four attachment points being located respectively by pairs in an upper part and in a lower part of the conduit.

* * * * *